(12) United States Patent
Ahmadi Kalateh Ahmad et al.

(10) Patent No.: US 9,709,693 B2
(45) Date of Patent: Jul. 18, 2017

(54) RANGING MEASUREMENT APPARATUS, METHODS, AND SYSTEMS

(71) Applicant: Halliburton Energy Services, Inc., Houston, TX (US)

(72) Inventors: Akram Ahmadi Kalateh Ahmad, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/710,821

(22) Filed: May 13, 2015

(65) Prior Publication Data
US 2016/0041296 A1 Feb. 11, 2016

Related U.S. Application Data (60) Provisional application No. 62/035,022, filed on Aug. 8, 2014.

(51) Int. Cl.
*G01V 3/38* (2006.01)
*G01V 3/30* (2006.01)
*G01V 3/26* (2006.01)

(52) U.S. Cl.
CPC ............... *G01V 3/38* (2013.01); *G01V 3/30* (2013.01); *G01V 3/26* (2013.01)

(58) Field of Classification Search
CPC ............................................. G01V 3/26–3/38
USPC ........................................................ 324/346
See application file for complete search history.

(56) References Cited

U.S. PATENT DOCUMENTS

| 5,512,830 | A  | * | 4/1996  | Kuckes  | G01V 3/26 |
|           |    |   |         |         | 324/346   |
| 7,769,553 | B2 | * | 8/2010  | Willen  | G01V 3/083 |
|           |    |   |         |         | 702/75    |
| 8,322,462 | B2 |   | 12/2012 | Kuckes  |           |
| 9,084,576 | B2 | * | 7/2015  | Guracar | A61B 8/463 |

(Continued)

FOREIGN PATENT DOCUMENTS

WO  WO-2014/089402 A2  6/2014
WO  WO-2014/089505 A1  6/2014

OTHER PUBLICATIONS

"International Application Serial No. PCT/US2015/030597, International Search Report mailed Aug. 20, 2015", 3 pgs.

(Continued)

*Primary Examiner* — Melissa Koval
*Assistant Examiner* — Rahul Maini
(74) *Attorney, Agent, or Firm* — Gilliam IP PLLC (57) ABSTRACT

A well ranging apparatus, systems, and methods which operate to detect and determine a relative distance and/or azimuthal direction of nearby target well conductors such as pipes, well casing, etc., from within a borehole of a drilling well. An electromagnetic signal receiver is rotated in a first borehole. During the rotating, an electromagnetic ranging signal is received at the electromagnetic signal receiver. The electromagnetic ranging signal originates from an electromagnetic source in the first borehole or a second borehole. A null in an Earth electromagnetic signal spectrum associated with a signal induced by the rotating within a magnetic field of the Earth is determined. The electromagnetic source to is set to operate at an excitation frequency that is selected based, at least in part, on the determined null.

22 Claims, 11 Drawing Sheets

(56) References Cited

U.S. PATENT DOCUMENTS

| | | |
|---|---|---|
| 9,404,354 B2 * | 8/2016 | Sugiura .................... G01V 3/18 |
| 2011/0139507 A1 | 6/2011 | Krueger et al. |
| 2012/0013339 A1 | 1/2012 | Kuckes et al. |
| 2013/0057287 A1 | 3/2013 | Le et al. |
| 2013/0118809 A1 | 5/2013 | Veeningen |
| 2013/0341092 A1 | 12/2013 | Hay et al. |
| 2014/0035586 A1 | 2/2014 | Rodney |

OTHER PUBLICATIONS

"International Application Serial No. PCT/US2015/030597, Written Opinion mailed Aug. 20, 2015", 5 pgs.

* cited by examiner

RANGING MEASUREMENT APPARATUS, METHODS, AND SYSTEMS

CLAIM OF PRIORITY

This application claims the benefit of U.S. Provisional Application Ser. No. 62/035,022, filed on Aug. 8, 2014 which application is incorporated by reference herein in its entirety.

BACKGROUND

The present disclosure relates generally to methods and apparatus that are used as part of ranging techniques, to determine distance and direction between wells in geological formations.

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" in which an electromagnetic source is located in the existing well and monitored via sensors on the drill string in the well under construction. Another technique involves systems that locate both the source and the sensor(s) on the drill string—these are sometimes called "passive ranging" systems by those of ordinary skill in the art. Such ranging techniques are sometimes limited in the degree of accuracy that can be obtained.

DETAILED DESCRIPTION

The need to more accurately determine the relative distance and direction between wells has motivated the discovery of the solutions described herein. For example, some embodiments use a rotating magnetometer for ranging measurements, while accommodating the effect of Earth's magnetic field on measurements. These solutions help to reduce the undesirable effects of Earth's magnetic field in ranging measurements when using a rotating sensor by selecting an excitation frequency based on the rotation rate of the sensor, and/or using a rotational-phase-domain based Frequency transform to process the measurements.

Figure 1:
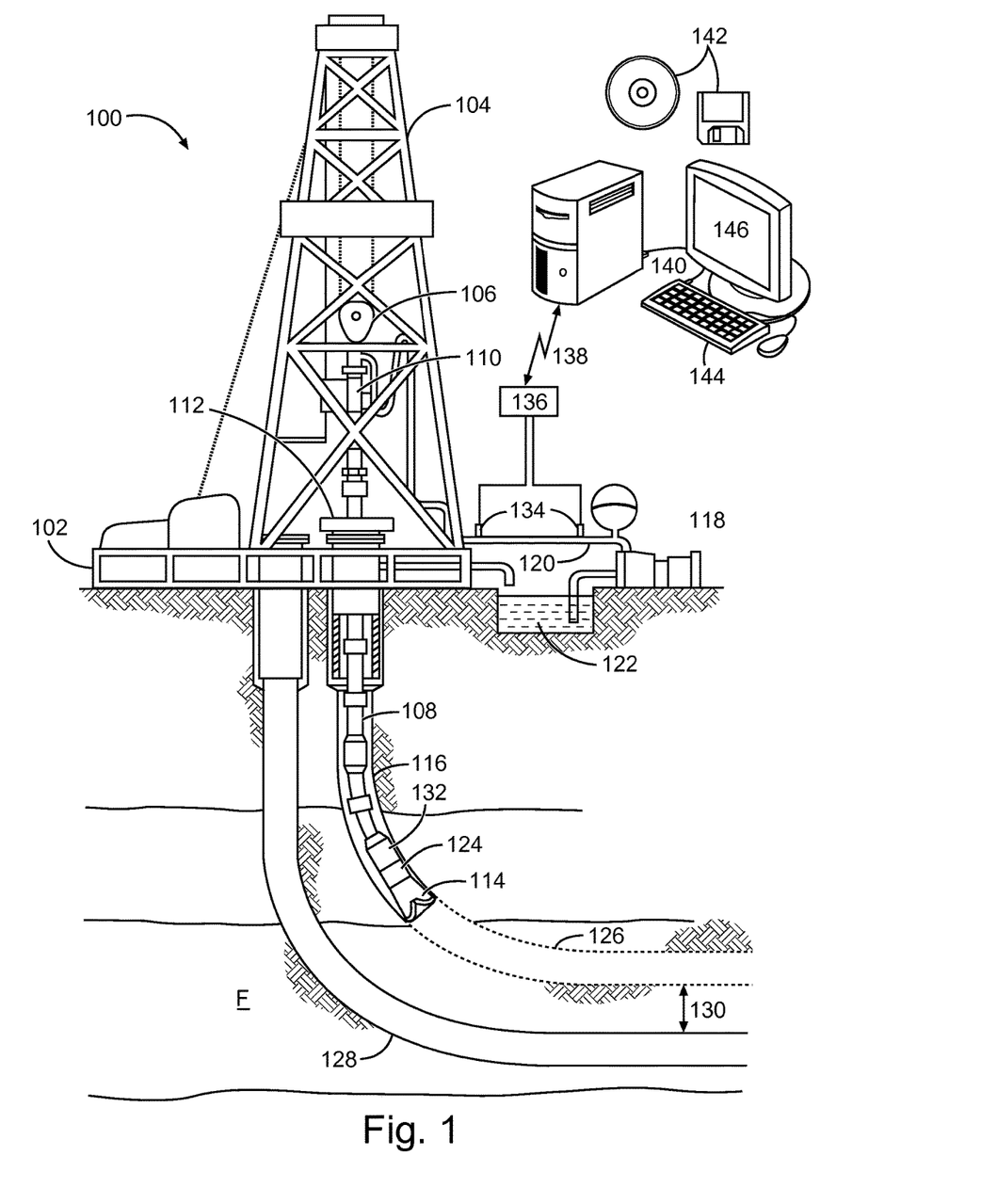
FIG. 1 depicts an example drilling environment in which ranging embodiments may be employed.

The disclosed apparatus (e.g., logging tools), systems, and methods are best understood in the context of the larger systems in which they operate. Accordingly, FIG. 1 illustrates an example drilling environment 100 in which ranging embodiments may be employed. Here, a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 124 to induce a current in nearby conductors such as pipes, casing strings, and conductive formations and to collect measurements of the resulting field to determine distance and direction. Using these measurements in combination with the tool orientation measurements, the driller can, for example, steer the drill bit 114 along a desired path 126 relative to the existing well 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may employ acoustic telemetry, electromagnetic telemetry, or telemetry via wired drillpipe.

The digitizer 136 supplies a digital form of the telemetry signals via a communications link 138 to a computer 140 or some other form of a data processing device. The computer 140 operates in accordance with software (which may be stored on information storage media 142) and user input via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly.

In standard ranging tool operations, a couple of sensors (at least two) are installed and fixed around the tool to measure the magnetic field at different positions at each specific depth. Sensors can be uniaxial, biaxial or triaxial. Direction and relative distance to target is determined based on the magnetic field measured by the sensors. Thus, the existing approach is based on the use of more than one sensor installed on the tool. Sensor calibration is fairly important when this approach is used, to avoid undesirable distortions in the measurements which may come from dissimilarity between the sensors.

One way to alleviate multi-sensor calibration issues is to use a single sensor and rotate it around the tool while measuring magnetic fields—so that the resulting data will be measured at different points by only one sensor. Thus, in various embodiments, a single rotating magnetometer can be used to collect ranging measurement data.

Another issue which arises involves the effect of the Earth's magnetic field on the measurements. The following discussion reveals how this effect can be managed when a single rotating sensor is used to obtain ranging measurements.

Magnetic field sensors comprise wire coils and their related circuitry to measure the voltage induced in the wire coils by a time-varying magnetic flux density. When the sensor is rotating in presence of a magnetic field, the magnetic flux passing through the coil/loop changes and generates an alternating magnetic field signal in the sensor. This signal, when caused by Earth's magnetic field, is generally unwanted and introduces error in ranging measurements. The field strength can be stated as a formula:

$$\vec{B}_M = \vec{B}_{E0} \cdot \vec{ds}.$$

In flux-gate or similar direct magnetic field measurement systems, the magnetic field as measured by the magnetometer due to changing the relative direction of the Earth's magnetic field creates a very large signal, on the order of approximately 50000 nT, which can overwhelm the signal originating from, or reflected (via backscatter) from the target welbore.

Figure 2:
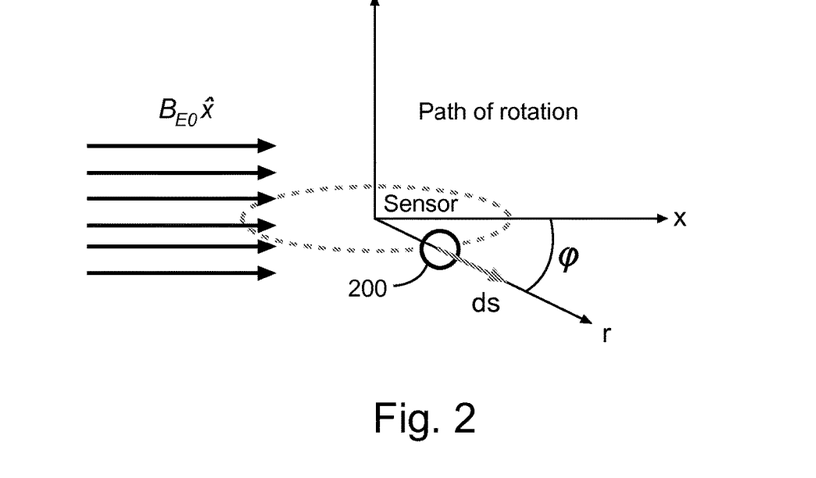
FIG. 2 shows an example of a loop rotating in the Earth's magnetic field, for various embodiments.

FIG. 2 shows an example of a loop antenna 200 rotating in the Earth's magnetic field, for various embodiments. Here, some solutions are proposed to reduce the effect of Earth's magnetic field, and thus, the error it introduces into ranging measurements—improving the measurement technology. In a first case, consider a loop antenna 200 rotating around the z-axis (often the longitudinal axis of the wellbore) with a frequency of $\omega_r = 2\pi f_r$ in the presence of a substantially constant magnetic field $B_{E0}$. FIG. 2 illustrates this situation.

Note that the loop antenna 200 is shown to be radially oriented, although for the purposes of this document, the loop may have any arbitrary orientation. Similarly, the Earth's field is shown to be active in the horizontal direction. Without loss of generality, the Earth's field can be active in any arbitrary direction.

The magnetic field ($B_M$) caused by the Earth's magnetic field can be formulated as:

$$B_M = B_{E0} \sin(\omega_r t),$$

where $B_M$ and $B_{E0}$ are the received magnetic field and Earth's magnetic field, respectively.

Figure 3:
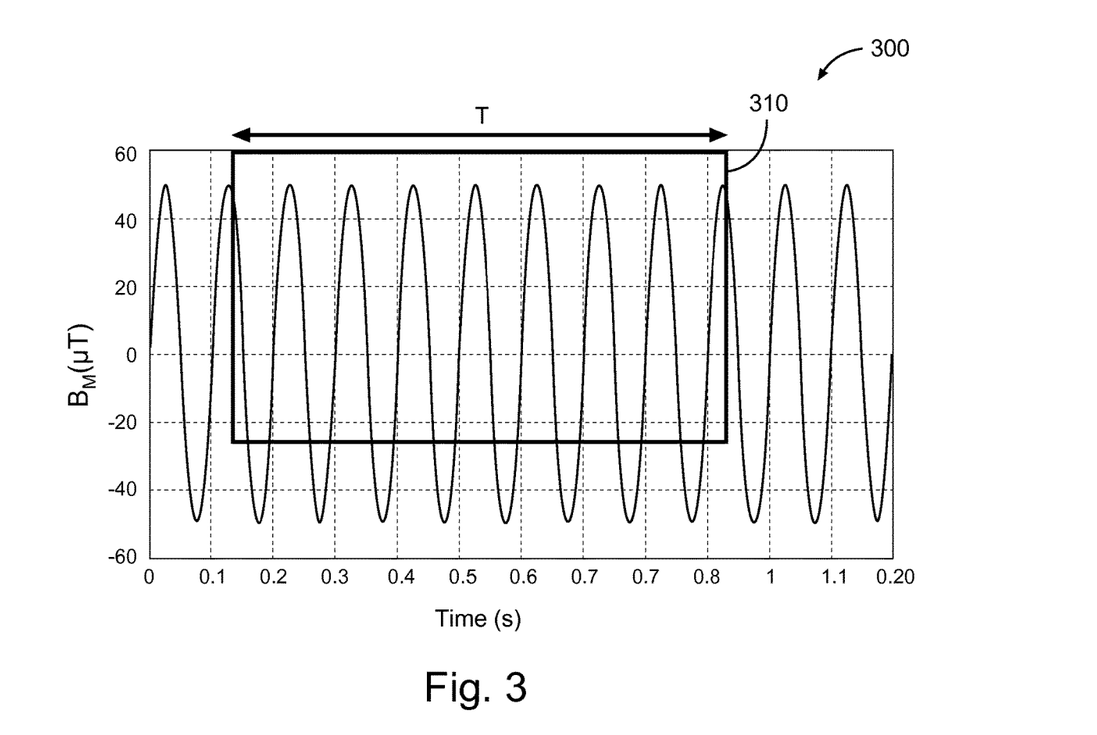
FIG. 3 is a graph illustrating the strength of the Magnetic field of the Earth at the rotating sensor, for various embodiments.

FIG. 3 is a graph 300 illustrating the strength of the Magnetic field of the Earth at the rotating sensor, for various embodiments. Here, the magnetic field caused by the Earth at the rotating sensor is shown, where $$\omega_r = 2\pi(10 \text{ Hz}), B_{E0} = 50\mu T.$$

To obtain the frequency spectrum of the magnetic field, $B_M$, a Fourier Transform (FT) of the signal is performed. The measurement window 310 which is termed the "reception window" should include an integer number of signal periods to avoid distortion in the FT signal. The sampled signal can be formulated as:

$$S_{Meas}(t) = S_i(t) rect_T(t),$$

where $S_i(t) = B_M(t)$ is the signal being measured, and $rect_T(t)$ is the measurement window 310.

Figure 4:
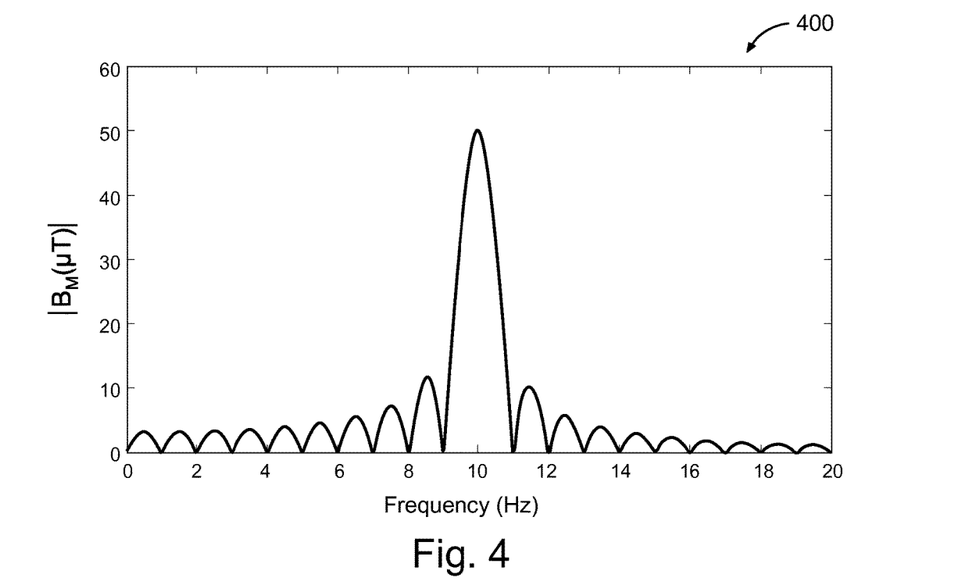
FIG. 4 is a graph illustrating a Fourier transform of the magnetic field in FIG. 3, into spectral components.

FIG. 4 is a graph 400 illustrating a Fourier transform of the magnetic field in FIG. 3, into spectral components. The Fourier signal of the sampled signal (caused by the Earth's magnetic field), $S_{Meas}(t)$, can be expressed as a sinc function as shown in the figure, where the sampling time T=1 second.

To reduce the effect of the unwanted effects of the Earth's magnetic field, the frequency of excitation ($f_i$) in target well (or the drilling well) should be selected at one or more frequencies where $B_M(f)$ has a minimum or null value, that is:

$$f_i = f_r \pm \frac{k}{T}; k = 1, 2, \ldots ;$$

where $f_r$ is the rotation frequency of the sensor and T is the sampling time of the signal.

To improve the results still further, it is often useful to select $f_i$ to be at the null locations further from the signal peaks, where the side-lobes are smaller. One can also take advantage of the multiple null locations, and pick the frequency of excitation $f_i$ to be where a better signal-to-noise ratio (SNR) exists within the signal spectrum.

When the magnetometer rotates, the signal coming from the excitation source interacts with the rotating sensor. So the signal from the excitation source can be expressed as a product of two cosine signals:

$$B_M = B_{Ex} \sin(\omega_r t) \sin(\omega_i t).$$

In this equation, $B_{Ex}$ is the field caused by the excitation source and $\omega_i$ is frequency of this excitation.

Figure 5:
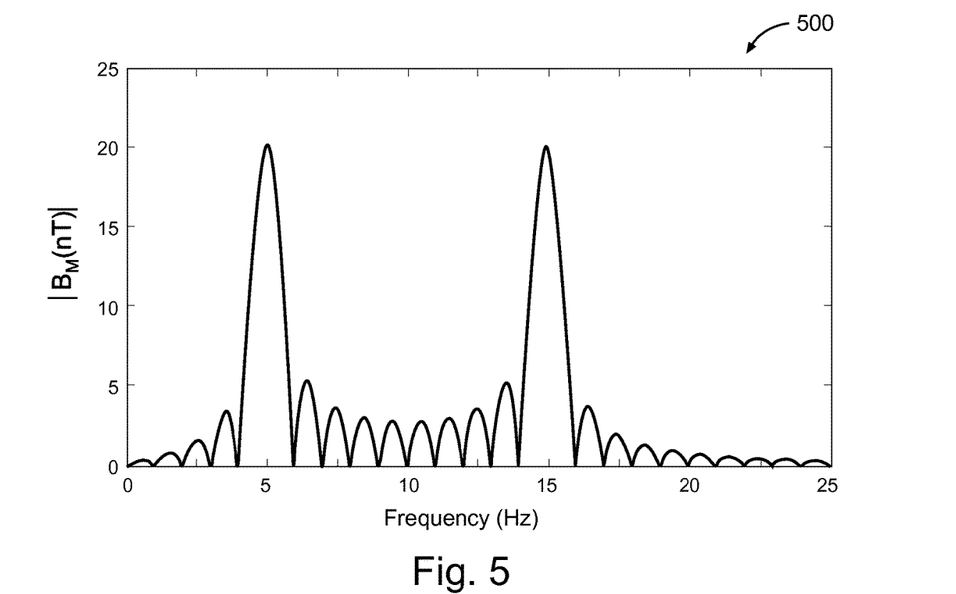
FIG. 5 is a graph illustrating a Fourier transform of an excitation source, into spectral components, for various embodiments.

FIG. 5 is a graph 500 illustrating a Fourier transform of a magnetic field caused by an excitation source, into spectral components, for various embodiments. The Fourier transform of this signal is a combination of two sinc functions at the frequencies $\omega_r + \omega_i$ and $\omega_r - \omega_i$. This figure shows the spectrum of the received signal caused by the excitation. In this figure, it is assumed that the excitation source is a current source of I=1 Amp, with an excitation frequency of $f_i$=5 Hz, at a distance of 5 meters from the sensor. The rotation rate of the sensor is: $f_r$=10 HZ. As seen, the resulting sinc functions are centered at 5 Hz and 15 Hz.

To provide a clean signal for use in ranging calculations, the frequency of reception can be selected. That is, the receiver can scan the spectrum of the received signal and once a peak is detected, the location of the peak in the spectrum is registered as the frequency of rotation: $\omega_r$, which is related to the B (magnetic) field of the Earth. The receiver can then select a frequency of reception, via filtering or some other mechanism, to favor the signal at $\omega_r + \omega_i$ or $\omega_r - \omega_i$, which are related to the excitation source. By scanning the spectrum of the received signal, the receiver can thus monitor changes in the rotation rate of the sensor ($\omega_r$) and dynamically edit the reading data.

Figure 6:
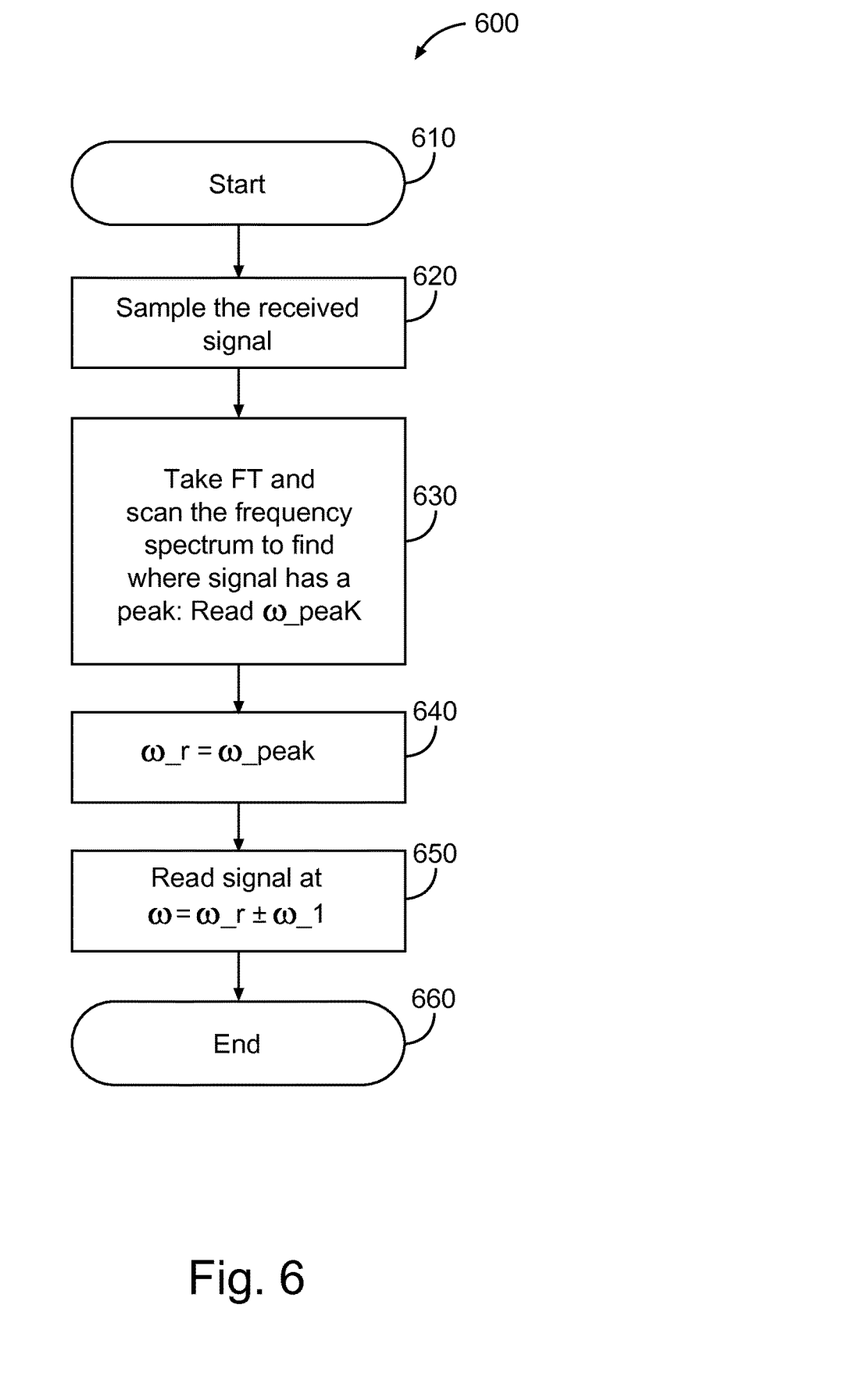
FIG. 6 is a flow diagram of a method of dynamic signal editing for various embodiments.

FIG. 6 is a flow diagram of a method 600 of dynamic signal editing for various embodiments. The figure illustrates an example of this procedure for each point of measurement, and tuning the receiver's frequency of reception. Thus, the received signal can be processed at each point.

At block 610, the method of processing the received signal begins. At block 620, the signal is sampled, perhaps using an analog-to-digital converter. At block 630, the FT of the sampled signal is taken, and a peak is detected. That peak signal location in the spectrum is set as the frequency of rotation at block 640. Once the frequency of rotation is known, the frequency of excitation $\omega_i$ can be selected. At block 650, the frequency of reception is set to be $\omega_r + \omega_i$ or $\omega_r - \omega_i$. The method ends at block 660.

Any of the methods described herein can be applied for any sensor rotating in the presence of any magnetic field. Signal processing can be also applied on the received signal to calibrate the sensor.

The peak and nulls of the Earth's magnetic field component can be calculated in a separate measurement cycle where the excitation source is turned OFF. This may provide a more accurate measurement of the peak and null frequencies, without contamination from the excitation signal. It is also possible to use gravitometers or surface measurements to determine the drill string rotation frequency. The source of excitation can then be turned ON to make the magnetic field measurement. If the rotation speed is not substantially uniform, multi-cycle averaging may be employed, where the sampling time is extended.

Similarly, peaks of the excitation signal (not necessarily the first or major peak) may be used to make measurements. This can be accomplished by measuring the signal at each peak, normalizing the magnitude to the magnetic field intensity at that frequency, and then performing a weighted average of magnetic field intensities of all excitation peaks, where large weights are used for high SNR measurements, and small weights are used for low SNR measurements. For the purposes of this document, anything above 40 dB can be considered a "high SNR", and anything lower than 40 dB can be considered a "low SNR". A large weight is 1, and a small weight is lower than 0.1. Weights can be chosen proportional to the SNR of each particular peak. The SNR can be calculated from a ratio of the spectrum that exists when the source of excitation is turned ON, to the spectrum that exists when the source of excitation is turned OFF.

In practice rotation speed may vary substantially over time. Variations in the rotation speed may create noise when the methods herein are applied. In order to obtain more stable results, calculations can be performed in the unwrapped rotation angle domain instead of the time domain. An example of this solution is now provided.

Referring now to FIGS. 7-10, a reception time of two seconds and a rotation speed of five rotations per second are used. The Earth's magnetic field is assumed to be horizontal, which is the worst case measurement.

Figure 7:
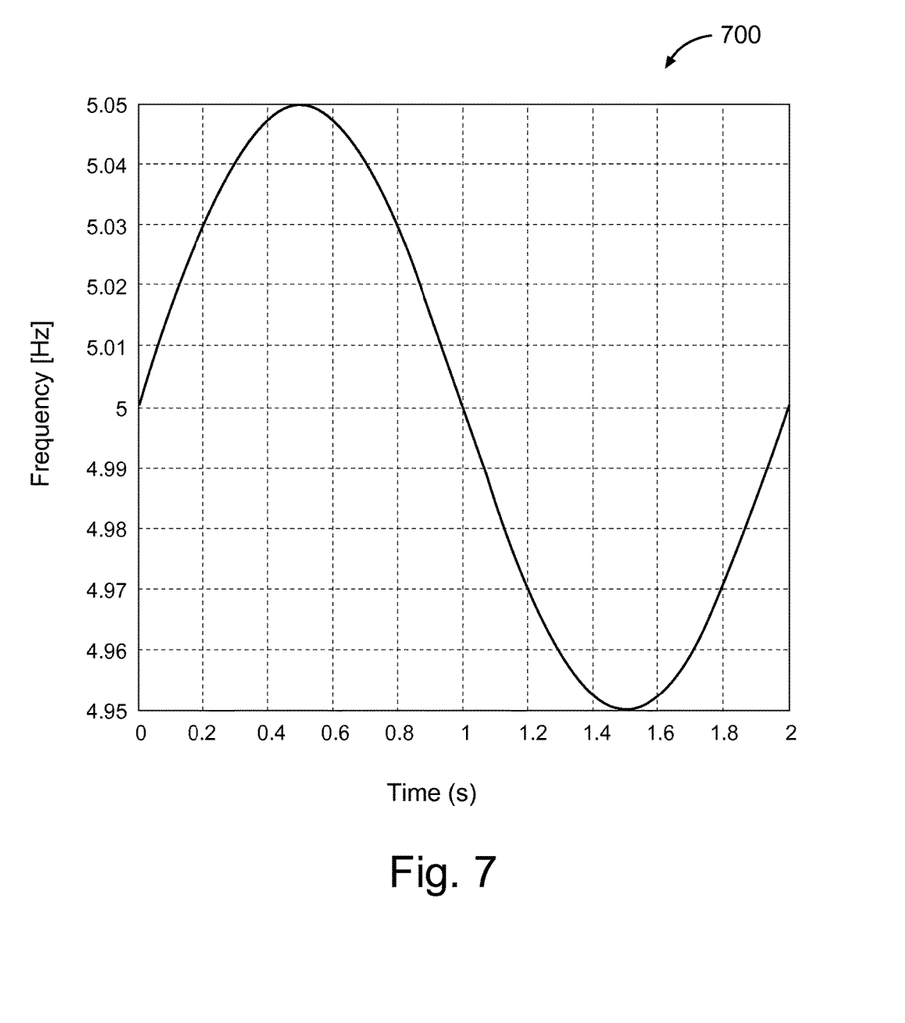
FIG. 7 is a graph of an example drill string rotation frequency, for various embodiments.

FIG. 7 is a graph 700 of an example drill string rotation frequency, for various embodiments. Here the rotation frequency varies, with a 10% sinusoidal variation over a two second sampling window. It is noted here that the results are not dependent on the shape of the frequency variation that is used. Instead, the results depend more on the magnitude of the variation.

Figure 8A:
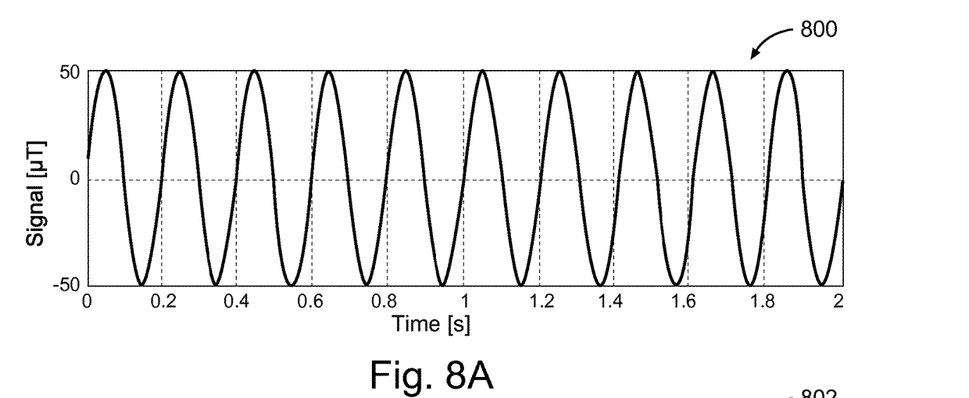
FIGS. 8A-8C are graphs of time-based Fourier analysis of the received signal, according to various embodiments.
Figure 8B:
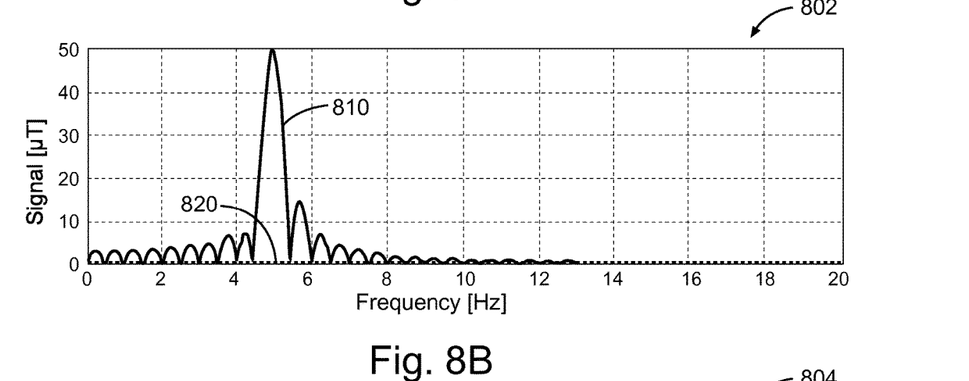
Figure 8C:
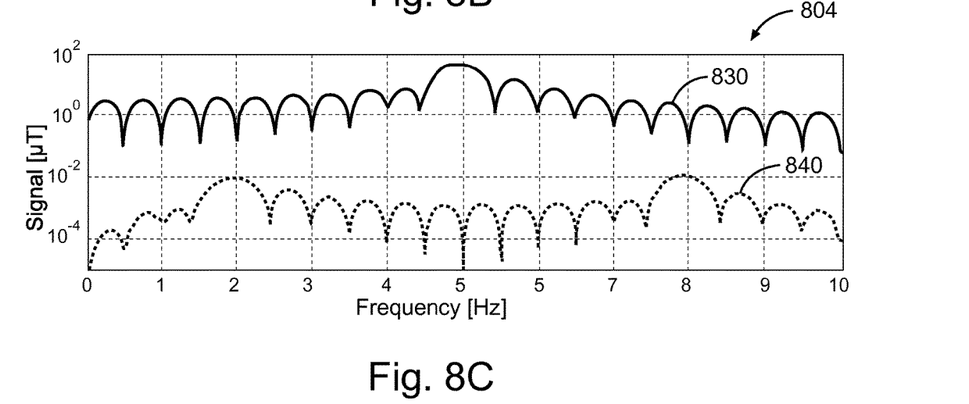

FIGS. 8A-8C are graphs 800, 802, 804 of time-based Fourier analysis of the received signal, according to various embodiments. These illustrate a frequency-domain analysis based on acquired time-domain data.

The time domain data is shown in FIG. 8A. The Fourier transform of the time domain data is shown in FIG. 8B (linear scale) and FIG. 8C (log scale) plots. The upper curves 810, 830 in FIGS. 8B, 8C are the received signal due to the Earth's magnetic field, while the lower curves 820, 840 in FIGS. 8B, 8C are the received signal from the target drill string for an excitation at 3 Hz. It can be seen in these figures that the target signal 820, 840 is much smaller than the signal 810, 830 generated by Earth's magnetic field at all frequencies considered, and the nulls (minimum points) of the Earth's magnetic field are not low enough to permit accurate measurement.

Figure 9A:
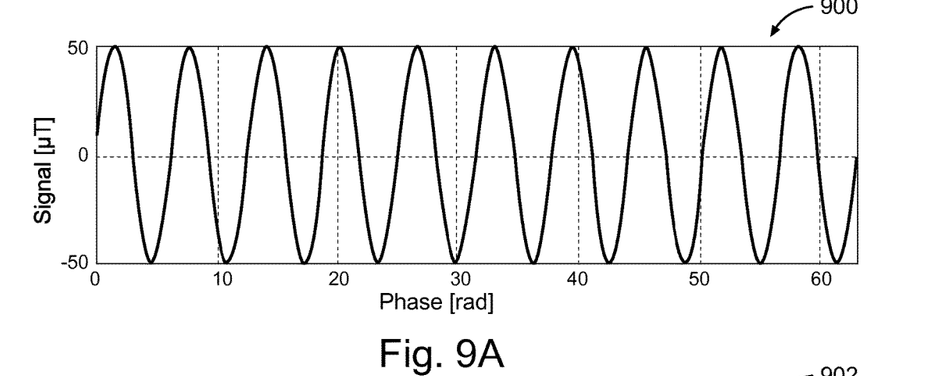
FIGS. 9A-9C are graphs of phase-based Fourier analysis of the received signal, at an excitation frequency of 3 Hz, according to various embodiments.
Figure 9B:
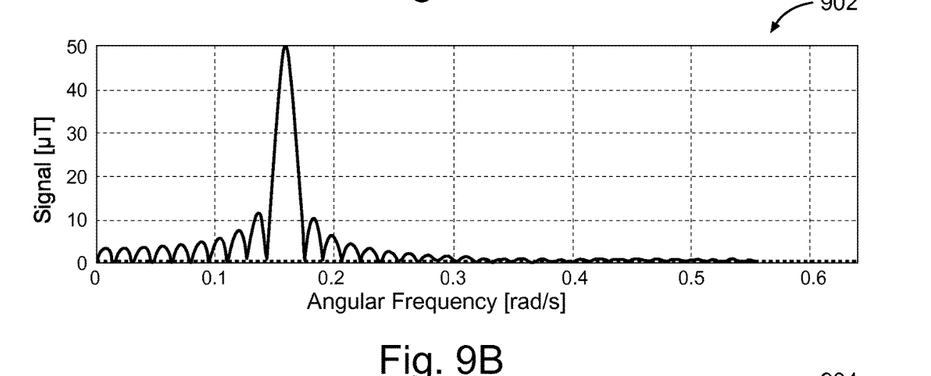
Figure 9C:
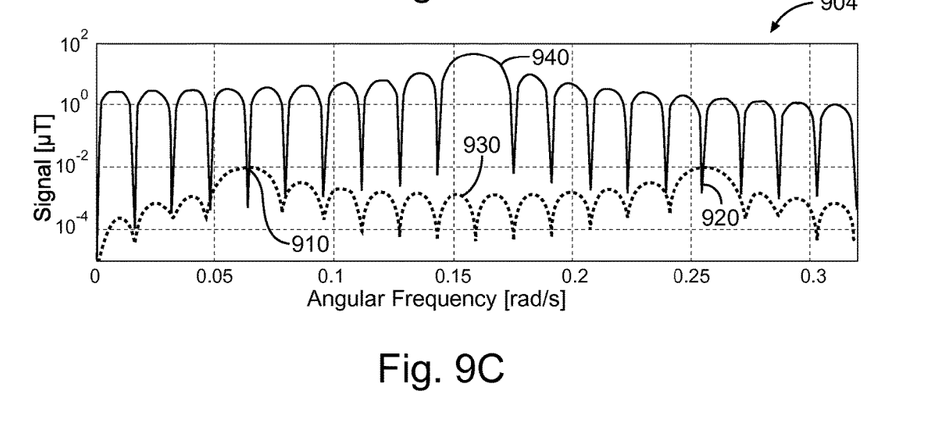

FIGS. 9A-9C are graphs 900, 902, 904 of phase-based Fourier analysis of the received signal, at an excitation frequency of 3 Hz, according to various embodiments. These illustrate a frequency-domain analysis based on the phase-domain data.

The phase domain data is shown in FIG. 9A. The Fourier transform of the phase domain data is shown in FIG. 9B (linear scale) and FIG. 9C (log scale) plots. Here it is seen that there are at least two frequencies (at ~0.065 rad/second and ~0.255 rad/second) 910, 920 where the target signal amplitude 930 is greater by at least an order of magnitude than the Earth's magnetic field amplitude 940.

Figure 10A:
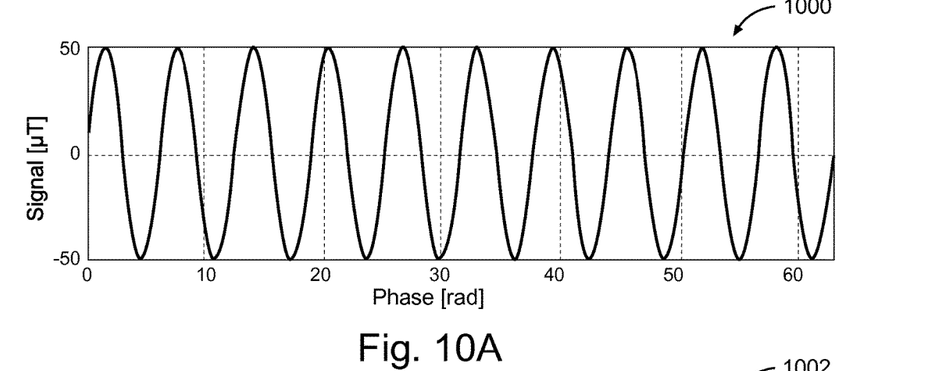
FIGS. 10A-10C are graphs of phase-based Fourier analysis of the received signal, at an excitation frequency selected to match the rotation frequency, according to various embodiments.
Figure 10B:
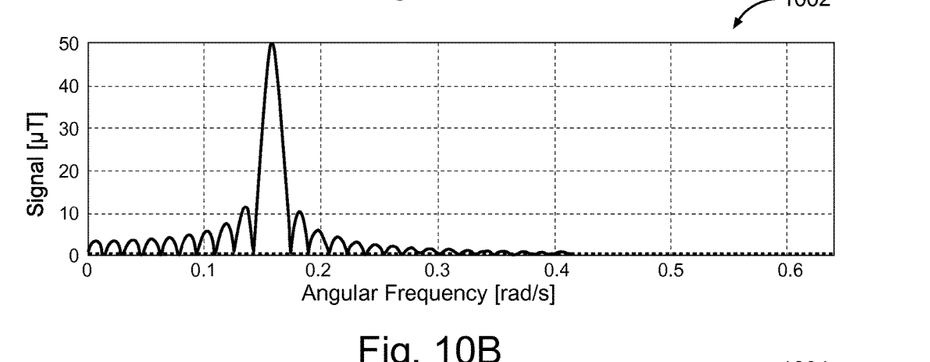
Figure 10C:
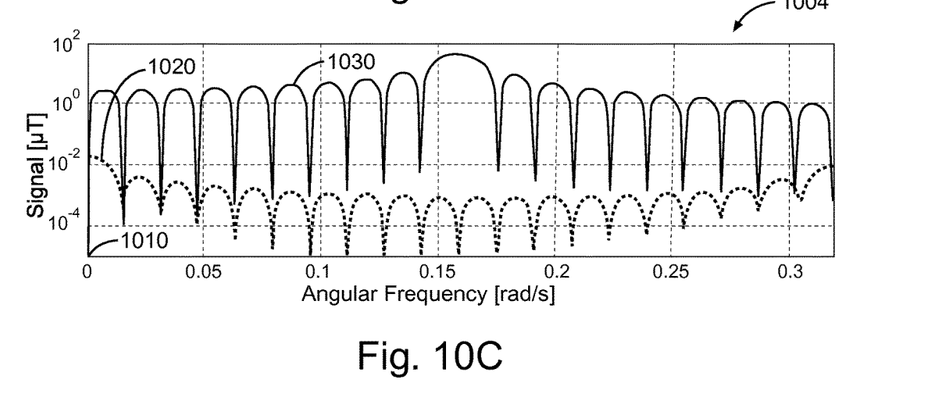

FIGS. 10A-10C are graphs 1000, 1002, 1004 of phase-based Fourier analysis of the received signal, at an excitation frequency selected to match the rotation frequency, according to various embodiments. These illustrate the case where excitation frequency is chosen to be the same as the rotation frequency.

The phase domain data is shown in FIG. 10A. The Fourier transform of the phase domain data is shown in FIG. 10B (linear scale) and FIG. 10C (log scale) plots. It can be clearly seen that, at a radial frequency zero 1010, the target signal amplitude 1020 is much greater than the Earth's magnetic field amplitude 1030, and that a more accurate measurement of the ranging distance signal can be made.

It is noted here that the unwrapped phase can be obtained by tracking the rotation angle of the drill string, either through the magnetic field measurements, gravity measurements, or surface measurements. In some embodiments, the source of excitation (e.g., the transmitter) is located at the target well, while the receiver is located in the drilling well. Moreover, in some embodiments, the transmitter and receiver are both located at a first well (either drilling or target), such that the receiver receives the signal via backscatter from the second well (either target or drilling).

Thus, in many embodiments, improvements are provided, because while previous approaches to determining the range between wells were based on stationary measurements (e.g., where drill string rotation is stopped), the disclosed methods enable ranging measurements during rotation. The reception frequency of the receiver can be tuned dynamically, based on the monitored rotation frequency of the receiver (e.g., magnetometer). In addition, most embodiments permit a reduction in the number of magnetometers used for ranging measurements. The accuracy of ranging measurements may be increased by avoiding calibration errors caused by dissimilarity between sensors. A non-limiting summary of various embodiments will now be given.

Figure 11:
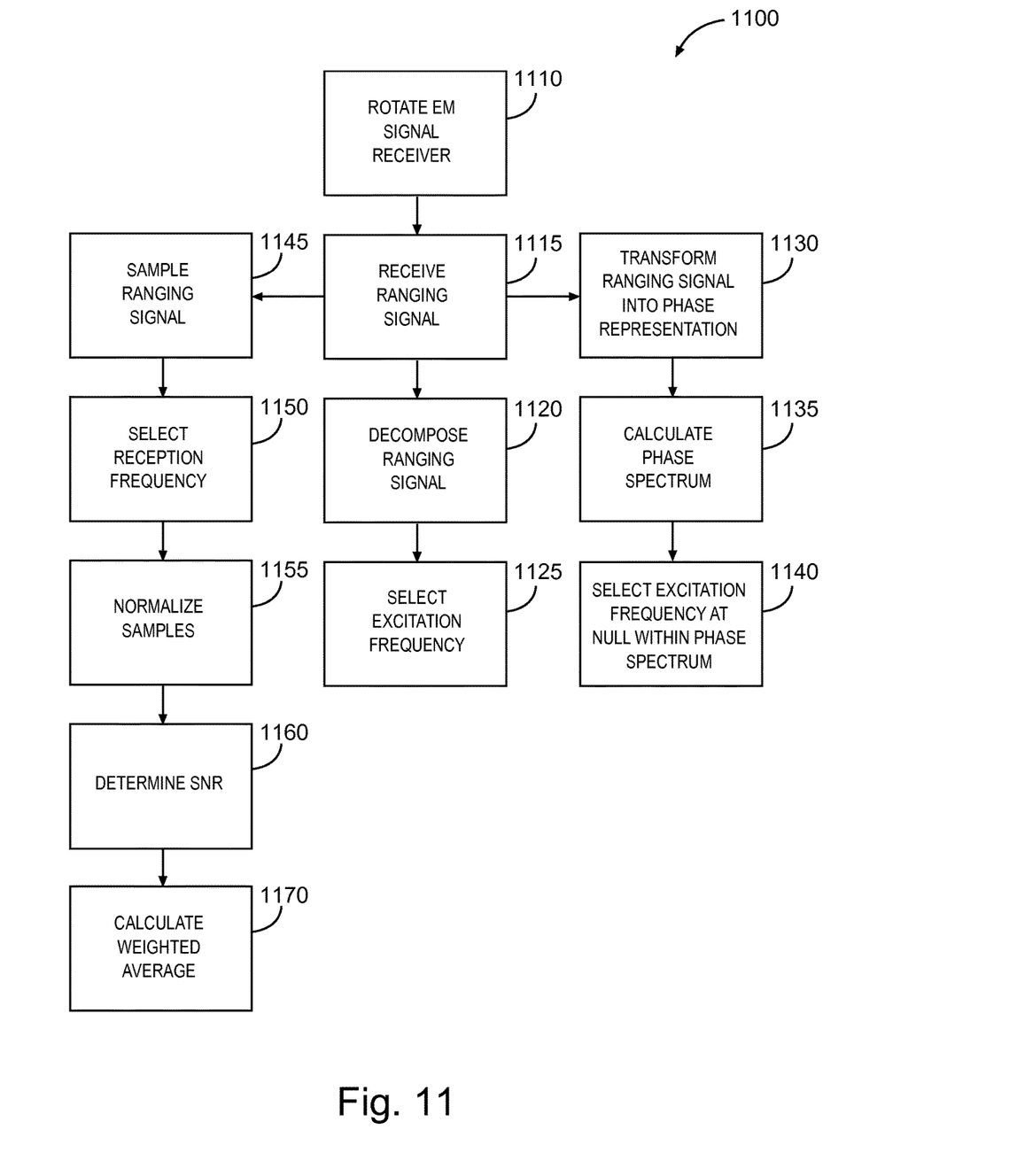
FIG. 11 is a flow diagram of methods, according to various embodiments.

FIG. 11 is a flow diagram of methods 1100, according to various embodiments. One method 1100 includes at block 1110 rotating an electromagnetic signal receiver in a first borehole (e.g., a drilling well), and at block 1115 receiving the ranging signal in the same borehole (e.g., a drilling well), at a frequency determined by the frequency of rotation. The origin of the ranging signal (meaning the excitation source) can be coupled to the same well as the receiver, or to a different well.

In an embodiment, a method 1100 comprises rotating an electromagnetic signal receiver at block 1110 in a first borehole; and at block 1115, during the rotating, receiving an electromagnetic ranging signal at the electromagnetic signal receiver, wherein the electromagnetic ranging signal originates from the first borehole or a second borehole and has an excitation frequency determined by a null in an Earth electromagnetic signal spectrum associated with a signal induced by the rotating within a magnetic field of the Earth.

The ranging signal can be decomposed to determine the frequency of rotation. Thus, the method 1100 may further comprise decomposing the electromagnetic ranging signal into frequency components to locate a peak frequency as a frequency of the rotating at block 1120.

Nulls in the decomposed Earth electromagnetic signal spectrum can be used to locate the frequency of excitation. Thus, the method 1100 may comprise selecting the excitation frequency to substantially coincide with the null in the Earth electromagnetic signal spectrum at block 1125.

In some embodiments, the ranging signal is transformed into a phase representation, as part of a pre-processing task that uses the acquired signal as feedback to adjust the frequency of reception. Thus, the method 1100 may comprise: transforming the electromagnetic ranging signal into a phase representation at block 1130.

The phase representation of the ranging signal can be transformed into a phase spectrum. Thus, the method 1100 may comprise: calculating a phase spectrum of the phase representation at block 1135.

The frequency of reception can be selected to coincide with the null locations in the received signal phase spectrum. Thus, the method 1100 may comprise: selecting the electromagnetic ranging frequency at a null location within the phase spectrum at block 1140.

Peak sampling can be applied to the ranging signal. Thus, the method 1100 may comprise sampling the electromagnetic ranging signal at a multiple peaks of a frequency related to the excitation frequency to provide a plurality of samples at block 1145.

The received signal includes a spectrum of frequencies. One or more may be selected as a reception frequency, so that ranging signal processing is conducted on the data that has been acquired at that frequency. This reception frequency may be determined by adding the excitation frequency to the rotation frequency, or by subtracting one frequency from the other, according to the formula f_reception=fr±fi. Thus, the method 1100 may comprise selecting a reception frequency as the combination or difference between a frequency of the rotating and the excitation frequency at block 1150.

The peak samples can be normalized, and used to determine a signal-to-noise spectrum. Thus, the method 1100 may comprise: normalizing the samples to magnetic field intensity to provide normalized samples at block 1155; and determining a signal-to-noise ratio of a spectrum associated with the electromagnetic ranging signal being turned ON and with the electromagnetic ranging signal being turned OFF at block 1160.

Once the signal-to-noise spectrum is determined, a weighted average of the normalized samples can be calculated, where the weights are proportional to components of the signal-to-noise ratio. Thus, the method 1100 may comprise: calculating a weighted average of the normalized samples, wherein the weights are proportional to the signal-to-noise ratio associated with individual ones of the multiple peaks at block 1170.

Figure 12:
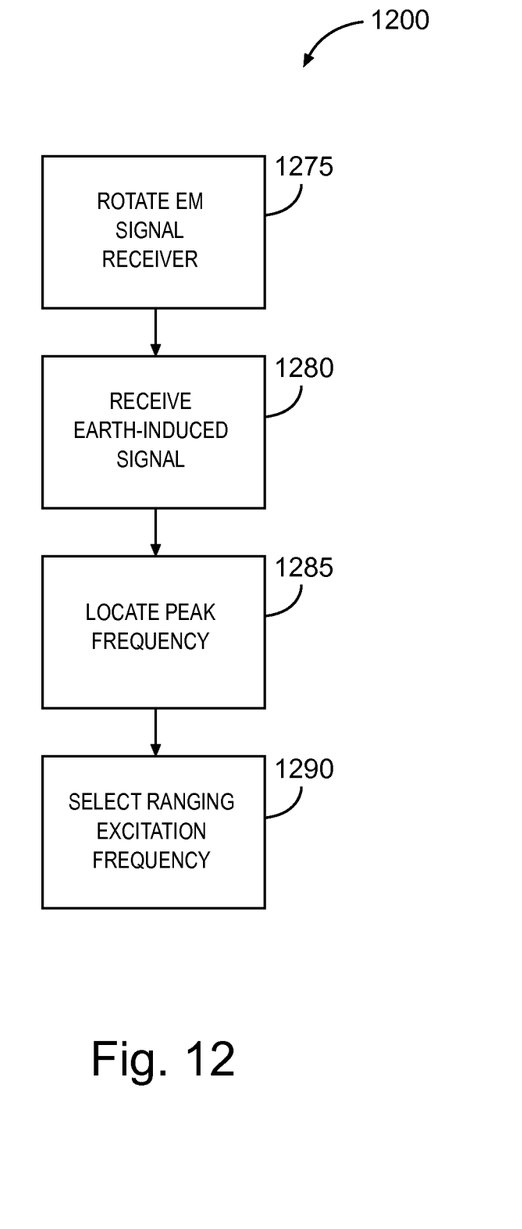
FIG. 12 is a flow diagram of additional methods, according to various embodiments.

FIG. 12 is a flow diagram of additional methods 1200, according to various embodiments. In some embodiments, the frequency of rotation is determined using only the Earth's magnetic signal, when the transmitter of the ranging signal is turned OFF. Thus, a method 1200 may comprise rotating an electromagnetic signal receiver in a borehole at block 1275; and during the rotating, at block 1280, receiving an Earth-induced electromagnetic signal in the absence of an electromagnetic ranging signal, to determine a ranging signal excitation frequency using a null in an Earth electromagnetic signal spectrum associated with the Earth-induced electromagnetic signal that is induced by the rotating within a magnetic field of the Earth 22. The method 1200 may further comprise, at block 1285, locating a peak frequency as a frequency of the rotating in a decomposed version of the Earth electromagnetic signal spectrum derived from the Earth-induced electromagnetic signal. The method 1200 may also comprise, at block 1290, selecting the ranging signal excitation frequency according to one or more determined null locations in the Earth's induced electromagnetic signal spectrum.

Figure 13:
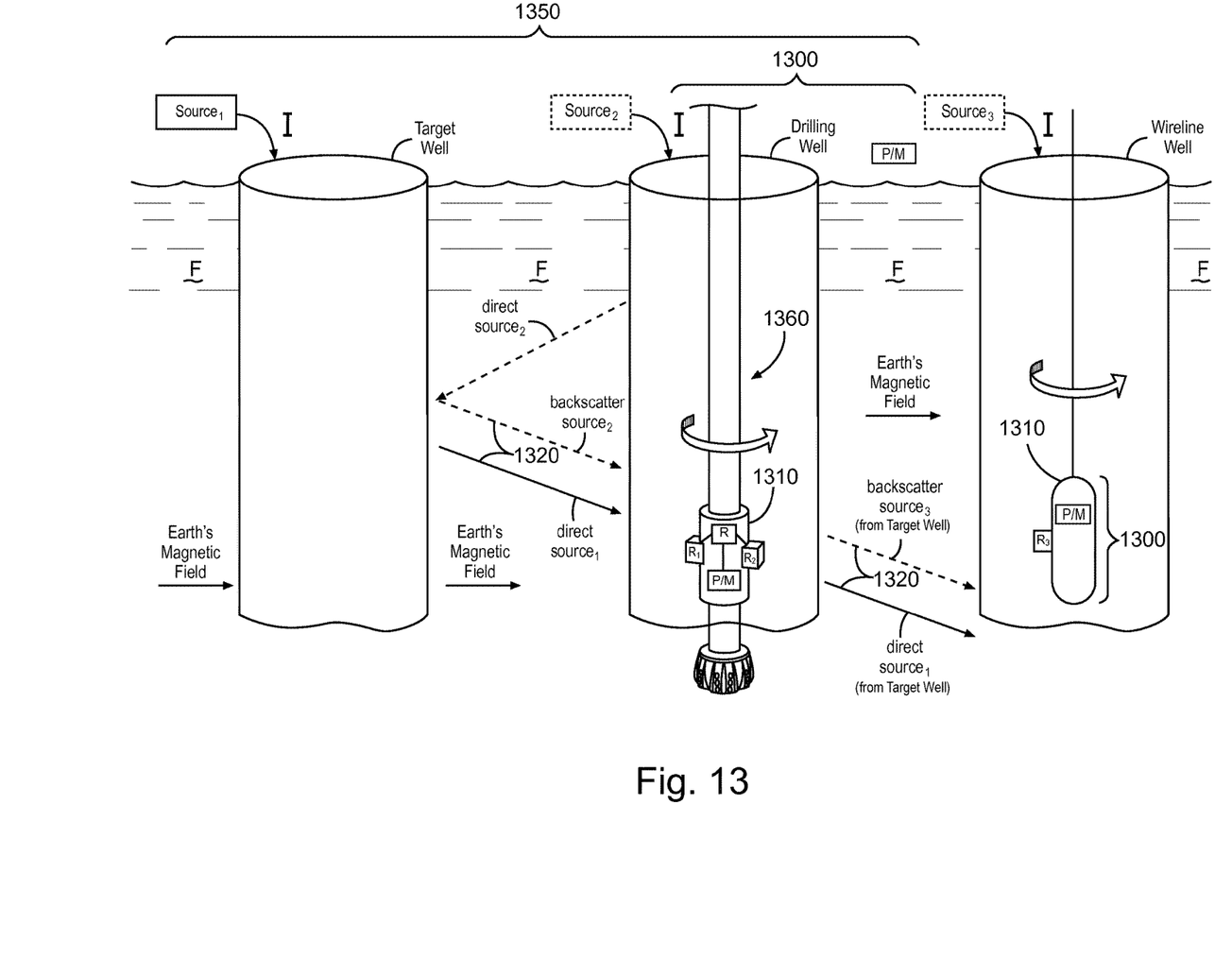
FIG. 13 is a block diagram of apparatus and systems, according to various embodiments.

FIG. 13 is a block diagram of apparatus 1300 and systems 1350, according to various embodiments. In some embodiments, an apparatus 1300 may comprise a housing 1310 and an electromagnetic signal receiver R1, R2, R3. Thus, the apparatus 1300 may comprise a downhole housing 1310; and an electromagnetic signal receiver R1, R2, R3 attached to the housing 1310, the receiver R1, R2, R3 to rotate with the housing 1310 and to receive an electromagnetic ranging signal 1320 having an excitation frequency determined by a null in an Earth electromagnetic signal spectrum associated with a signal induced by rotation of the electromagnetic signal receiver within a magnetic field of the Earth.

The housing 1310 may be used in drilling wells, as part of a drill string or a logging apparatus. Thus, in the apparatus 1300, the housing may comprise a drilling collar or a downhole logging tool.

The apparatus 1300 may include a processor P programmed in a variety of ways, such as to decompose the Earth electromagnetic signal spectrum into its component parts. Thus, the apparatus 1300 may comprise a processor P having access to a memory M (the combination is denoted as P/M in the figures) storing a program to cause the processor P to decompose the Earth electromagnetic signal spectrum to determine a location of the null.

Decomposition may occur using the Fourier transform. Thus, in the apparatus 1300, the processor P is operable to decompose the Earth electromagnetic signal spectrum using a Fourier transform.

Acquired ranging signal data may be transformed from its raw form into a processed form that has been adjusted according to changes that occur in the frequency of rotation. This process, which may be designated as a method of dynamic editing, might occur as follows. At each measurement point, the system 1350 (e.g., a combination of components that includes the apparatus 1300) takes a sample of the received signal 1320 and applies a Fourier transform to get the frequency/phase spectrum of the signal. Then, by scanning the spectrum of the received signal, the system can monitor the changes in the rotation rate of the sensor and find the current rotation frequency. The system can then operate to edit the excitation frequency, or edit the frequency of reception based on the received signal. Thus, when the frequency of rotation changes, the system can track those changes and edit the acquired signals based on those detected changes.

Therefore, in some embodiments, the apparatus 1300 comprises a processor P having access to a memory M storing a program to cause the processor P to dynamically transform data derived from the electromagnetic ranging signal 1320 according to changes in a rate of rotation, as determined by decomposing the electromagnetic ranging signal into a spectrum of signal components.

A system 1350 might include an excitation source Source1, Source2, Source3, and an electromagnetic signal receiver R1, R2, R3. Thus, a system 1350 may comprise an excitation source Source1, Source2, Source3, associated with a target well or a drilling well to transmit an electromagnetic ranging signal 1320 into a surrounding formation F; and an electromagnetic signal receiver R1, R2, R3 located in the drilling well, to rotate and to receive the electromagnetic ranging signal 1320, directly or via backscatter, wherein the electromagnetic ranging signal 1320 has an excitation frequency determined by a null in an Earth electromagnetic signal induced by rotation of the electromagnetic signal receiver within a magnetic field of the Earth.

The electromagnetic signal receiver R1, R2, R3 may include one or more magnetometers. Thus, in the system 1350, the electromagnetic signal receiver R1, R2, R3 may comprise a single magnetometer included in a down hole drill string 1360.

The system 1350 may include a processor programmed to adjust the excitation frequency. Thus, the system 1350 may comprise a processor P having access to a memory M storing a program to cause the processor to adjust the excitation frequency to coincide with the null in the Earth electromagnetic spectrum, wherein the null is selected from one of multiple nulls in the Earth electromagnetic spectrum based on a signal-to-noise ratio associated with the null.

The excitation frequency may be adjusted based on the frequency of rotation in the drilling well. Thus, the system 1350 may comprise a processor P having access to a memory M storing a program to cause the processor P to adjust a reception frequency of a reception circuit R coupled to the electromagnetic signal receiver R1, R2, R3 according to a rotational speed of a drilling string 1360 in the drilling well.

The excitation frequency may be determined according the frequency of rotation and the sampling time of the ranging signal. Thus, in the system 1350, the excitation source frequency can be determined according to the formula $fi=fr \pm k/T$, wherein $fi$ is the excitation source frequency, $fr$ is a frequency associated with rotational speed, k is a positive integer, and T is a sampling time of the electromagnetic ranging signal.

In one embodiment, the present disclosure may be embodied as a set of instructions on a computer readable medium M comprising ROM (read-only memory), RAM (random access memory), CD (compact disk), DVD (digital video disk), hard drive, flash memory device, or any other computer readable medium, now known or unknown, that when executed causes a computing system, such as computer as illustrated in FIG. 1 or some other form of a data processing device P, to implement a method of the present disclosure, for example the methods described in FIGS. 11 and 12.

Though described serially in the examples of FIGS. 11 and 12, one of ordinary skill in the art would recognize, after reviewing this disclosure, that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. In many situations, it may not be necessary to perform explicit distance and direction calculations. For example, the signal components may be extracted and converted to pixel colors or intensities and displayed as a function of tool position and azimuth. Assuming the target casing string is within detection range, it will appear as a bright (or, if preferred, a dark) band in the image. The color or brightness of the band indicates the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation. It is intended that the following claims be interpreted to embrace all such variations and modifications.

This detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those of ordinary skill in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

What is claimed is:

1. A method comprising:
   rotating an electromagnetic signal receiver in a first borehole;
   during the rotating, receiving an electromagnetic ranging signal at the electromagnetic signal receiver, wherein the electromagnetic ranging signal originates from an electromagnetic source in the first borehole or a second borehole;
   determining a null in an Earth electromagnetic signal spectrum associated with a signal induced by the rotating within a magnetic field of the Earth; and
   operating the electromagnetic source to transmit at an excitation frequency that is selected based, at least in part, on the determined null.

2. The method of claim 1, further comprising:
   decomposing the electromagnetic ranging signal into frequency components to locate a peak frequency as a frequency of the rotating.

3. The method of claim 2, further comprising:
   selecting the excitation frequency to substantially coincide with the null in the Earth electromagnetic signal spectrum.

4. The method of claim 1, further comprising:
   transforming the electromagnetic ranging signal into a phase representation.

5. The method of claim 4, further comprising:
   calculating a phase spectrum of the phase representation.

6. The method of claim 5, further comprising:
   selecting the excitation frequency at a null location within the phase spectrum.

7. The method of claim 1, further comprising:
   sampling the electromagnetic ranging signal at multiple peaks of a frequency related to the excitation frequency to provide a plurality of samples.

8. The method of claim 7, further comprising:
   selecting a reception frequency as a combination or difference between a frequency of the rotating and the excitation frequency.

9. The method of claim 8, further comprising:
   normalizing the samples to magnetic field intensity to provide normalized samples; and
   determining a signal-to-noise ratio of a spectrum associated with the electromagnetic ranging signal being turned ON and with the electromagnetic ranging signal being turned OFF.

10. The method of claim 9, further comprising:
    calculating a weighted average of the normalized samples, wherein the weights are proportional to the signal-to-noise ratio associated with individual ones of the multiple peaks.

11. An apparatus, comprising:
    a sensor to, during rotation of an electromagnetic signal receiver in a first borehole, receive an electromagnetic ranging signal at the electromagnetic signal receiver, wherein the electromagnetic ranging signal originates from an electromagnetic source in the first borehole or a second borehole;
    a processor; and
    a non-transitory machine-readable medium having program code executable by the processor to cause the apparatus to,
    determine a null in an Earth electromagnetic signal spectrum associated with a signal induced by the rotating within a magnetic field of the Earth; and
    operate the electromagnetic source to transmit at an excitation frequency that is selected based, at least in part, on the determined null.

12. The apparatus of claim 11, further comprising:
    a downhole housing comprises a drilling collar or a downhole logging tool, wherein the sensor is attached to and rotates with the downhole housing.

13. The apparatus of claim 11, wherein the program code further includes program code executable by the processor to cause the apparatus to:
    decompose the Earth electromagnetic signal spectrum to determine a location of the null.

14. The apparatus of claim 13, wherein the program code further includes program code executable by the processor to cause the apparatus to decompose the Earth electromagnetic signal spectrum using a Fourier transform.

15. The apparatus of claim 11, wherein the program code further includes program code executable by the processor to cause the apparatus to:
dynamically transform data derived from the electromagnetic ranging signal according to changes in a rate of rotation, as determined by decomposing the electromagnetic ranging signal into a spectrum of signal components.

16. A system, comprising:
an excitation source associated with a target well or a drilling well to transmit an electromagnetic ranging signal into a surrounding formation; and
an electromagnetic signal receiver located in the drilling well, to rotate and to receive while rotating the electromagnetic ranging signal, directly or via backscatter;
a processor having access to a non-transitory memory storing program code to,
determine a null in an Earth electromagnetic signal spectrum associated with a signal induced by rotation of the electromagnetic signal receiver within a magnetic field of the Earth; and
select an excitation frequency based on the determined null; and a transmitter that transmits a signal at the selected excitation frequency.

17. The system of claim 16, wherein the electromagnetic signal receiver is a single magnetometer included in a down hole drill string.

18. The system of claim 16, further comprising:
a processor having access to a memory storing a program to cause the processor to adjust the excitation frequency to coincide with the null in the Earth electromagnetic spectrum, and wherein the null is selected from one of multiple nulls in the Earth electromagnetic spectrum based on a signal-to-noise ratio associated with the null.

19. The system of claim 16, further comprising:
a processor having access to a memory storing a program to cause the processor to adjust a reception frequency of a reception circuit coupled to the electromagnetic signal receiver according to a rotational speed of a drilling string in the drilling well.

20. A method, comprising:
rotating an electromagnetic signal receiver in a borehole;
during the rotating, receiving an Earth-induced electromagnetic signal in the absence of an electromagnetic ranging signal;
determining a null in an Earth electromagnetic signal spectrum associated with the Earth-induced electromagnetic signal that is induced by the rotating within a magnetic field of the Earth; and
operating a electromagnetic source to transmit at an excitation frequency that is selected based, at least in part, on the determined null.

21. The method of claim 20, further comprising:
locating a peak frequency as a frequency of the rotating in a decomposed version of the Earth electromagnetic signal spectrum derived from the Earth-induced electromagnetic signal.

22. The method of claim 20, further comprising:
sampling the electromagnetic ranging signal at multiple peaks of a frequency related to the excitation frequency to provide a plurality of samples;
selecting a reception frequency as a combination or difference between a frequency of the rotating and the excitation frequency;
normalizing the samples to magnetic field intensity to provide normalized samples;
determining a signal-to-noise ratio of a spectrum associated with the electromagnetic ranging signal being turned ON and with the electromagnetic ranging signal being turned OFF; and
calculating a weighted average of the normalized samples, wherein the weights are proportional to the signal-to-noise ratio associated with individual ones of the multiple peaks.

* * * * *